US012696360B2

(12) United States Patent
Jeong et al.

(10) Patent No.: US 12,696,360 B2
(45) Date of Patent: Jul. 28, 2026

(54) COOKING APPARATUS

(71) Applicant: SAMSUNG ELECTRONICS CO., LTD., Suwon-si (KR)

(72) Inventors: Jiho Jeong, Suwon-si (KR); Minjae Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 1005 days.

(21) Appl. No.: 17/671,138

(22) Filed: Feb. 14, 2022

(65) Prior Publication Data

US 2022/0322501 A1 Oct. 6, 2022

Related U.S. Application Data

(63) Continuation of application No. PCT/KR2022/000688, filed on Jan. 13, 2022.

(30) Foreign Application Priority Data

Mar. 31, 2021 (KR) ........................ 10-2021-0042316
Jul. 1, 2021 (KR) ........................ 10-2021-0086299

(51) Int. Cl.
*H05B 6/64* (2006.01)

(52) U.S. Cl.
CPC ........... *H05B 6/642* (2013.01); *H05B 6/6414* (2013.01); *H05B 6/6426* (2013.01)

(58) Field of Classification Search
CPC .... H05B 6/642; H05B 6/6414; H05B 6/6426; H05B 6/64; H05B 6/6482; F24C 15/02
USPC .......................................................... 219/757
See application file for complete search history.

(56) References Cited

U.S. PATENT DOCUMENTS

| | | | | |
|---|---|---|---|---|
| 8,490,616 | B2 | 7/2013 | Venezia et al. | |
| 8,637,793 | B2 * | 1/2014 | Kwag | F24C 15/006 219/391 |
| 10,024,541 | B2 * | 7/2018 | Wojick | H05B 6/64 |
| 10,502,431 | B2 * | 12/2019 | Lee | F23M 5/00 |
| 11,885,502 | B2 | 1/2024 | Barth et al. | |

(Continued)

FOREIGN PATENT DOCUMENTS

| | | | |
|---|---|---|---|
| CN | 101684948 A | | 3/2010 |
| CN | 107660011 A | * | 2/2018 |

(Continued)

OTHER PUBLICATIONS

English Translation CN 107660011 (Year: 2024).*

(Continued)

*Primary Examiner* — Elizabeth M Kerr
*Assistant Examiner* — Simpson A Chen
(74) *Attorney, Agent, or Firm* — STAAS & HALSEY LLP

(57) ABSTRACT

Disclosed herein is a cooking apparatus. The cooking apparatus includes a housing, a cooking chamber formed in the housing, a heater arranged on one side of the cooking chamber, a door coupled to the housing to open and close the cooking chamber, the door including a door body provided to form an exterior of the door, a handle recessed from an outer surface of the door body, and a cooling plate positioned adjacent to an inner surface of the door body corresponding to the handle so as to dissipate heat that is generated by the heater and transferred to the handle.

10 Claims, 14 Drawing Sheets

(56) References Cited

U.S. PATENT DOCUMENTS

| | | | | |
|---|---|---|---|---|
| 2007/0267402 | A1* | 11/2007 | Harned | F24C 15/026 219/408 |
| 2009/0093864 | A1* | 4/2009 | Anderson | A61B 18/1477 607/99 |
| 2014/0021199 | A1 | 1/2014 | Adeniyi et al. | |

FOREIGN PATENT DOCUMENTS

| | | | | | |
|---|---|---|---|---|---|
| CN | 212755342 | U | | 3/2021 | |
| DE | 10 2018 214 143 | A1 | | 2/2020 | |
| DE | 102019119410 | A1 | * | 10/2020 | |
| GB | 2186967 | A | * | 8/1987 | F24C 15/02 |
| JP | 60-164133 | | | 8/1985 | |
| JP | 4-306419 | | | 10/1992 | |
| JP | 2521013 | | | 12/1996 | |
| JP | 2000-65363 | | | 3/2000 | |
| JP | 2002-267178 | | | 9/2002 | |
| JP | 2010-203689 | | | 9/2010 | |
| KR | 1999-0055047 | | | 7/1999 | |
| KR | 10-2008-0037408 | A | | 4/2008 | |
| KR | 10-2009-0104942 | A | | 10/2009 | |
| KR | 10-2009-0104943 | | | 10/2009 | |
| KR | 10-2013-0011486 | A | | 1/2013 | |
| KR | 10-2016-0015916 | A | | 2/2016 | |
| KR | 10-2019-0124584 | A | | 11/2019 | |

OTHER PUBLICATIONS

English Translation DE 102019119410 (Year: 2024).*

European Search Report dated Oct. 25, 2024, in European Application No. EP 22 78 1353.

International Search Report dated May 4, 2022, in International Application No. PCT/KR2022/000688.

Korean Office Action dated May 25, 2025, in Korean Application No. 10-2021-0086299.

* cited by examiner

COOKING APPARATUS

CROSS-REFERENCE TO RELATED APPLICATION(S)

This application is a continuation application, filed under 35 U.S.C. § 111(a), of International Application PCT/KR2022/000688, filed Jan. 13, 2022, and is based on and claims priority under 35 U.S.C. § 119 to Korean Patent Applications No. 10-2021-0042316, filed on Mar. 31, 2021, and No. 10-2021-0086299, filed on Jul. 1, 2021, in the Korean Intellectual Property Office. The disclosures of International Application PCT/KR2022/000688, and Korean Patent Applications No. 10-2021-0042316 and No. 10-2021-0086299, are incorporated by reference herein in their entireties

BACKGROUND

1. Field

The disclosure relates to a cooking apparatus, and more particularly, to a cooking apparatus including an improved heat dissipation structure.

2. Description of Related Art

A cooking apparatus is an appliance for heating and cooking a cooking object such as food material, and refers to a device capable of providing various functions related to cooking, such as heating, thawing, drying, and sterilization of the cooking object.

Examples of such a cooking apparatus include an oven such as a gas oven or an electric oven, a microwave heating device (hereinafter referred to as a microwave), a gas range, an electric range, a gas grill, or an electric grill.

A cooking apparatus may cook food material by directly transferring heat to a food material or heating the inside of a cooking chamber using a heating source that generates heat, such as a heater. In this case, air inside the cooking apparatus heated by the heater may heat a door.

If the door is heated excessively, a user may be injured, and thus there are cases where a handle is separately coupled to the door. However, in recent, there is a need of reducing the transfer of heat to a user while improving an appearance and reducing the material cost by forming a handle of the door on the outside of the door without separately coupling the handle to the door.

SUMMARY

Additional aspects of the disclosure will be set forth in part in the description which follows and, in part, will be obvious from the description, or may be learned by practice of the disclosure.

In accordance with an aspect of the disclosure, a cooking apparatus includes a cooking chamber, a heater to heat an inside of the cooking chamber, a door to open and close the cooking chamber, the door including a door body forming an exterior of the door, a handle formed by a recess in an outer surface of the door body, and a cooling plate in contact with an inner surface of the door body corresponding to the handle so as to dissipate heat that is generated by the heater and transferred to the handle.

The heater may be positioned in an upper side of the cooking chamber, the outer surface of the door body may be an upper surface of the door body, and the inner surface of the door body may be an upper portion of the door body.

The door may further include a front panel coupled to a front of the door body to allow an inside of the cooking chamber to be seen from an outside of the cooking apparatus, and the front panel, the door body, and the cooling plate may be sequentially in contact with each other to transfer heat from the cooling plate to the front panel.

The cooling plate may include a first plate portion in contact with an upper inner surface of the door body, and a second plate portion bent downwardly from an end of the first plate portion and in contact with a front wall of the door body to transfer heat to the front panel.

The cooking apparatus may further include an insulating member disposed under the first plate portion to block transfer of convection heat to the handle.

The cooking apparatus may further include a cover plate coupled to the cooling plate from a rear side of the cooling plate so that the insulating member is accommodated between the cover plate and the cooling plate.

The cover plate and the insulating member may be formed in a size in accordance with the cooling plate.

The handle may be in a central portion of an upper end of the door body, the door body may include a plurality of fixing ribs protruding rearwardly from the front wall to fix the cooling plate, and the cooling plate may be between the plurality of fixing ribs in a left and right direction.

The plurality of fixing ribs may be spaced downward from an upper periphery of the door body. The door body may further include a plurality of connection plates extending downwardly from the upper periphery of the door body toward each of the plurality of fixing ribs to connect each of the plurality of fixing ribs to the upper periphery of the door body. Each of the plurality of connection plates may include a depressed portion depressed toward the front of the door body to reduce heat transferred from the plurality of fixing ribs to the handle.

The cooling plate may be screw-fastened to the front wall of the door body.

The door body may further include an inlet formed at a bottom of the door body to allow outside air to be introduced, and an outlet formed in a side wall of the door body to allow air, which is introduced through the inlet, to be discharged.

The outer surface of the door body may be an outer lateral surface of the door body, and the cooling plate may be positioned on an inner lateral surface of the door body.

The door may further include a front panel coupled to a front of the door body to allow an inside of the cooking chamber to be seen from an outside of the cooking apparatus. The front panel, the door body, and the cooling plate may be sequentially in contact with each other to transfer heat from the cooling plate to the front panel.

The cooling plate may include a first plate portion in contact with the inner lateral surface of the door body, and a second plate portion bent laterally from an end of the first plate portion and in contact with a front wall of the door body so as to transfer heat to the front panel.

The cooking apparatus may further include a cover plate behind the cooling plate, and an insulating member between the cooling plate and the cover plate.

In accordance with another aspect of the disclosure, a cooking apparatus configured to cook a food material includes a housing in which a cooking chamber is formed, a heater arranged on one side of the cooking chamber, a door coupled to the housing to open and close the cooking chamber, the door including a door body provided to form an exterior of the door and a front panel coupled to a front portion of the door body to allow an inside of the cooking chamber to be seen, a handle recessed from an outer surface of the door body, and a cooling plate positioned on an inner surface of the door body corresponding to the handle so as to dissipate heat that is generated by the heater and transferred to the handle. Heat generated by the heater is transferred to an outside of the cooking apparatus through the cooling plate, the front portion of the door body, and the front panel.

The cooling plate may include a first plate portion in contact with an inner end of the door body, and a second plate portion bent downwardly from one end of the first plate portion and in contact with a front wall of the door body so as to transfer heat to the front panel.

The cooking apparatus may further include a cover plate positioned behind the cooling plate, and an insulating member positioned between the cooling plate and the cover plate in an up and down direction to be accommodated between the cooling plate and the cover plate, the insulating member provided to block convection heat generated in the cooking apparatus.

The heater may be positioned in an upper side of the cooking chamber; the handle may be recessed from an upper outer surface of the door body, and the cooling plate may be positioned in an upper portion of the door body in accordance with a position of the handle.

In accordance with another aspect of the disclosure, a cooking apparatus includes a housing in which a cooking chamber is formed, a heater arranged on one side of the cooking chamber, a door coupled to the housing to open and close the cooking chamber, the door including a door body provided to form an exterior of the door and a front panel coupled to a front portion of the door body to allow an inside of the cooking chamber to be seen, a handle recessed from an upper outer surface of the door body, a cooling plate positioned on an upper inner surface of the door body in accordance with a position, in which the handle is formed, so as to conduct heat, which is generated by the heater, to the front panel, and an insulating member provided to prevent heat generated by the heater from being convected and transferred to the handle, the insulating member positioned in such a way that the handle, the cooling plate and the insulating member are positioned in order in an up and down direction.

BRIEF DESCRIPTION OF THE DRAWINGS

These and/or other aspects of the disclosure will become apparent and more readily appreciated from the following description of embodiments, taken in conjunction with the accompanying drawings of which.

DETAILED DESCRIPTION

Figure 1:
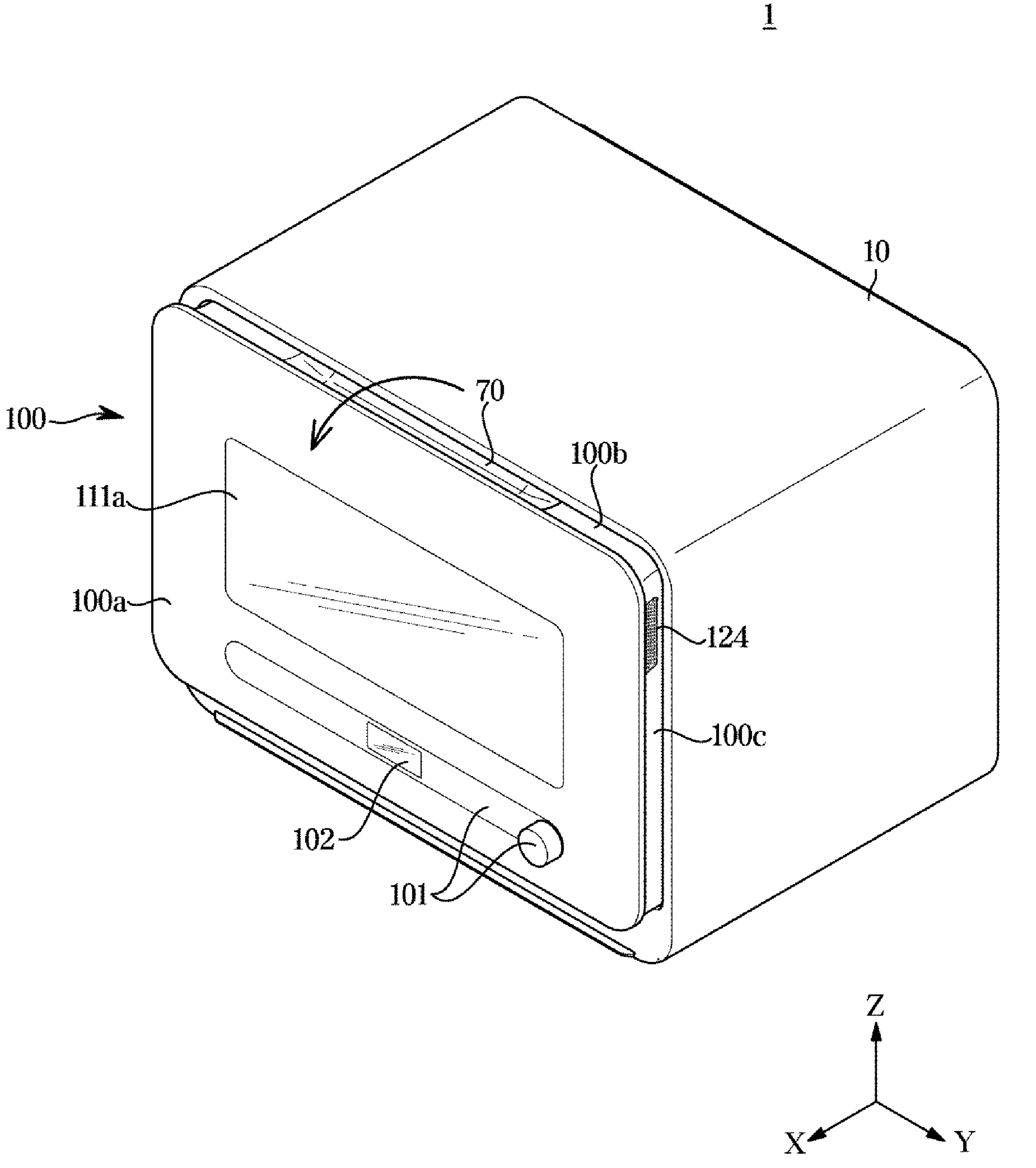
FIG. 1 is a perspective view illustrating a cooking apparatus according to an embodiment of the disclosure.

Embodiments described in the disclosure and configurations illustrated in the drawings are merely examples of the embodiments of the disclosure, and may be modified in various different ways at the time of filing of the present application to replace the embodiments and drawings of the disclosure.

In addition, the same reference numerals or signs illustrated in the drawings of the disclosure indicate elements or components performing substantially the same function.

Also, the terms used herein are used to describe the embodiments and are not intended to limit and/or restrict the disclosure. The singular forms "a," "an" and "the" are intended to include the plural forms as well, unless the context clearly indicates otherwise. In this disclosure, the terms "including", "having", and the like are used to specify features, numbers, steps, operations, elements, components, or combinations thereof, but do not preclude the presence or addition of one or more of the features, elements, steps, operations, elements, components, or combinations thereof.

It will be understood that, although the terms first, second, third, etc., may be used herein to describe various elements, but elements are not limited by these terms. These terms are only used to distinguish one element from another element. For example, without departing from the scope of the disclosure, a first element may be termed as a second element, and a second element may be termed as a first element. The term of "and/or" includes a plurality of combinations of relevant items or any one item among a plurality of relevant items.

In the following detailed description, the terms of "front", "rear", "left side", "right side" and the like may be defined by the drawings, but the shape and the location of the component is not limited by the term.

According to an aspect of the disclosure, a cooking apparatus includes a heat dissipation structure configured to dissipate heat transferred to a door.

According to another aspect of the disclosure, a cooking apparatus is capable of preventing a temperature of a handle from rising to a high temperature.

Hereinafter the disclosure will be described more fully hereinafter with reference to the accompanying drawings.

Hereinafter the disclosure will be described more fully hereinafter with reference to the accompanying drawings.

Figure 2:
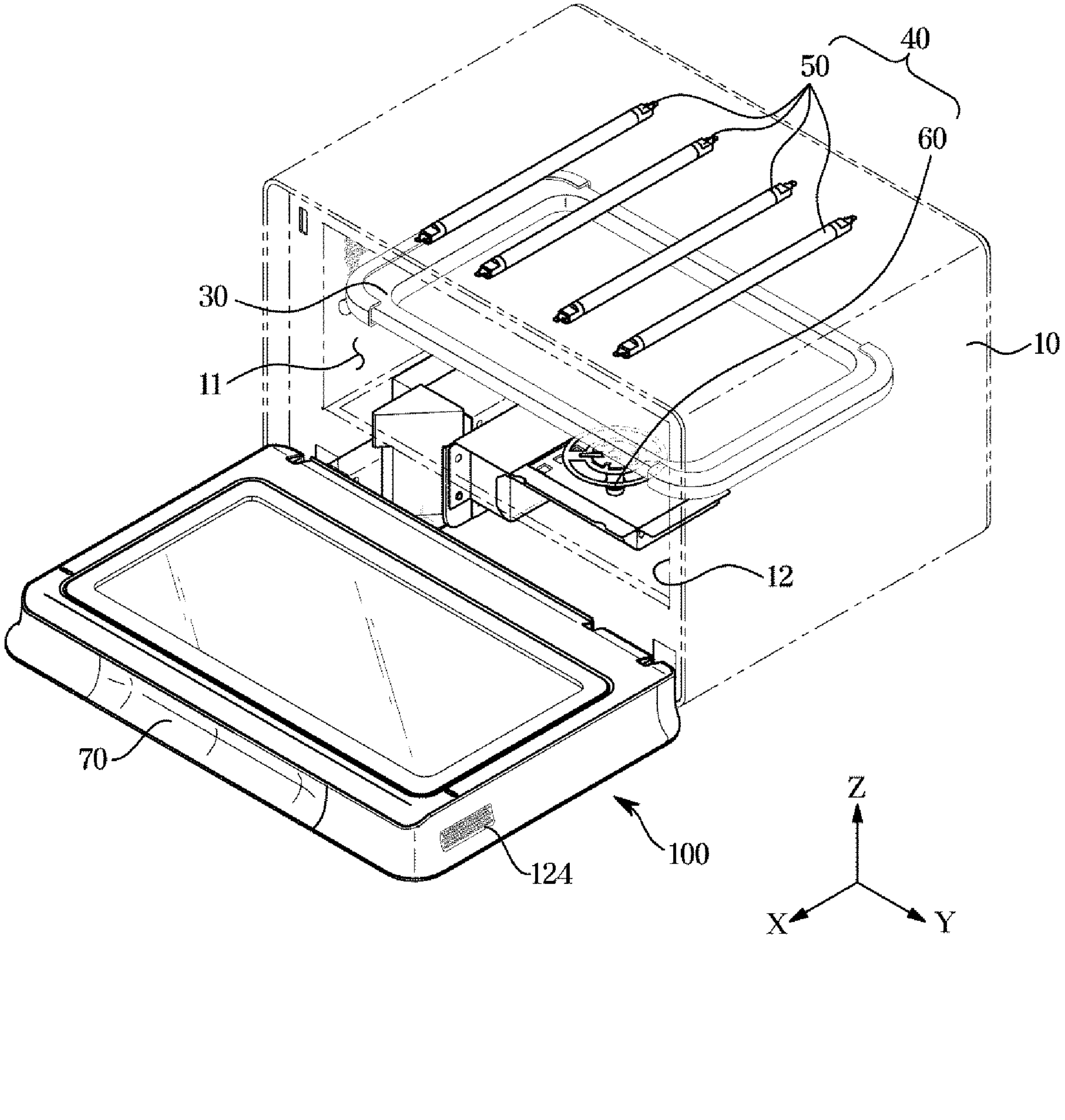
FIG. 2 is a perspective view illustrating a state in which a door is opened in the cooking apparatus illustrated in FIG. 1.
Figure 3:
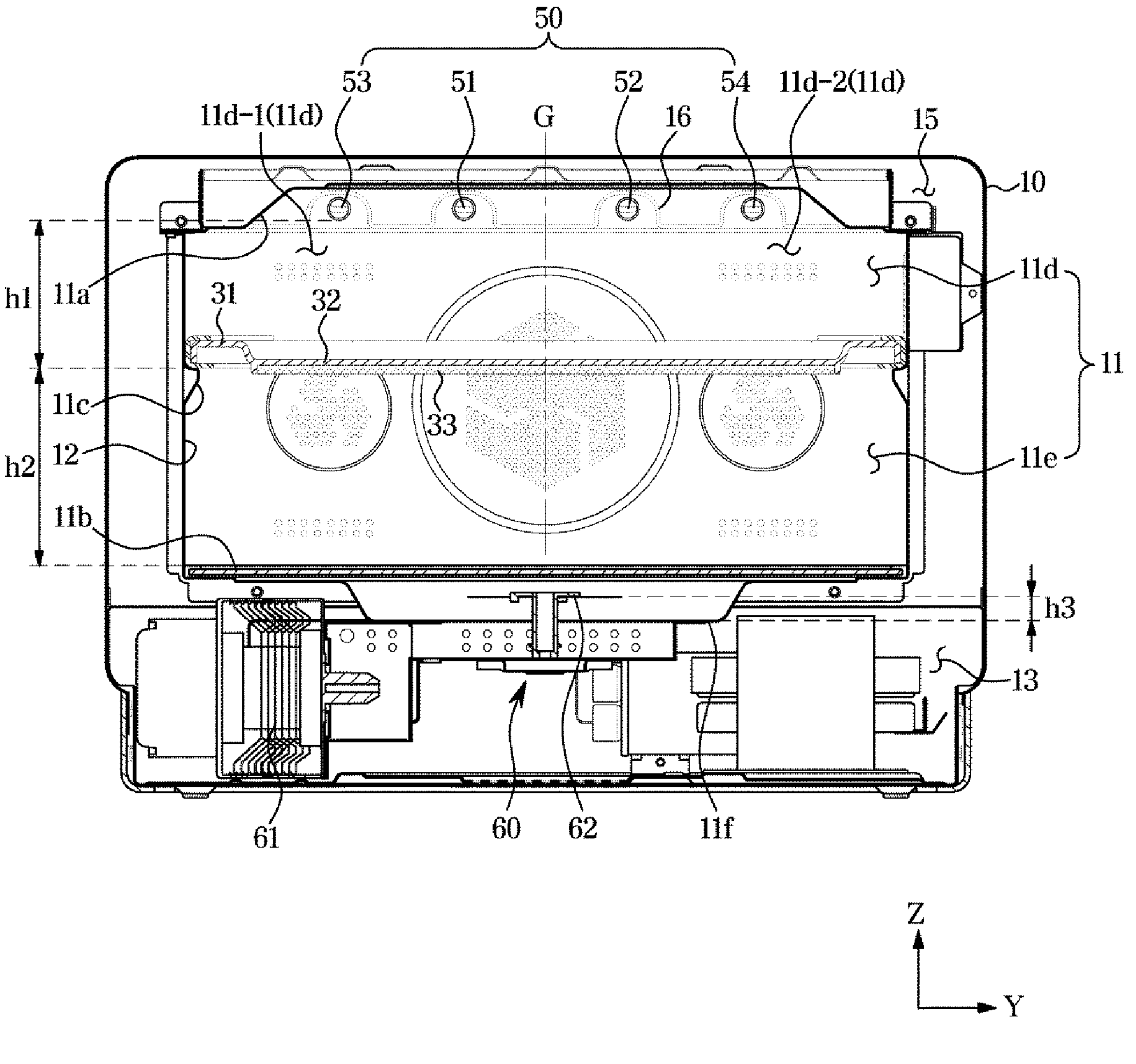
FIG. 3 is a front view illustrating the cooking apparatus illustrated in FIG. 1.

FIG. 1 is a perspective view illustrating a cooking apparatus according to an embodiment of the disclosure. FIG. 2 is a perspective view illustrating a state in which a door is opened in the cooking apparatus illustrated in FIG. 1. FIG. 3 is a front view illustrating the cooking apparatus illustrated in FIG. 1.

Referring to FIGS. 1 to 3, a cooking apparatus 1 according to an embodiment of the disclosure may include an outer housing 10 provided to form an exterior, and a cooking chamber 11 arranged inside the outer housing 10 and in which a food material is placed.

The cooking apparatus 1 may include an inner housing 12 arranged inside the outer housing 10 and provided to form the cooking chamber 11. A certain separation space 15 may be formed between the inner housing 12 and the outer housing 10. The inner housing 12 may be referred to as a housing 12.

The outer housing 10 and the inner housing 12 may be provided to be opened in a first direction X, which is a front direction of the cooking apparatus 1.

A user may place the food material in the cooking chamber 11 through an opening of the inner housing 12 formed in the first direction X.

The cooking chamber 11 may be provided in a substantially rectangular parallelepiped shape having a long side in a second direction Y perpendicular to left and right directions with respect to the first direction X.

The cooking apparatus 1 may include a machine room 13 formed inside the outer housing 10 and arranged below the cooking chamber 11. Various electronic components configured to drive the cooking apparatus 1 may be arranged inside the machine room 13.

The cooking apparatus 1 may include a door 100 configured to open and close the openings of the outer housing 10 and the inner housing 12.

The door 100 may include an inputter 101 and a display 102 through which a user inputs a signal to control the cooking apparatus 1.

The door 100 may include a see-through window 111*a* to allow the inside of the cooking chamber 11 to be observed upon closing the cooking chamber 11. The see-through window 111*a* may be formed on a front surface 100*a* of the door.

The cooking apparatus 1 may include a handle 70. The handle 70 may be recessed in an upper surface 100*b* of the door 100 to be used for a user to open and/or close the door 100. For example, the handle 70 may include a recessed portion 70 formed in outer surfaces 120*a* and 120*b* of a door body. In this case, the door 100 may be opened in a top-down method. The top-down method refers to a method in which the front surface 100*a* of the door is opened to face downward. However, the opening and closing method of the door 100 is not limited to the above example. In addition, the handle 70 may be recessed from a side surface 100*c* and/or a lower surface of the door 100 as well as the upper surface 100*b*.

According to an embodiment of the disclosure, because the handle 70 is recessed in the upper surface 100*b*, the side surface 100*c*, or the lower surface of the door 100, there is no need to separately couple the handle 70 and thus material cost may be reduced and the appearance of the door 100 may be improved.

The cooking apparatus 1 may include a shelf 30 mounted inside the cooking chamber 11 and provided to allow a user to place a food material therein. The shelf 30 may be detachably arranged inside the cooking chamber 11.

The cooking chamber 11 may include a support portion 11*c* formed on opposite lateral surfaces of the cooking chamber 11 to allow the shelf 30 to be mounted between an upper surface 11*a* and a lower surface 11*b* of the cooking chamber 11.

The support portion 11*c* may be provided in plural in a third direction Z perpendicular to an up and down direction with respect to the first direction X or the second direction Y to allow the shelf 30 to be mounted at various heights.

The shelf 30 may include a main body 31 and a cooking surface 32 on which a food material is placed. The cooking surface 32 may be provided to face the upper surface 11*a* of the cooking chamber 11 when the shelf 30 is mounted.

The cooking apparatus 1 may include a heat source 40 configured to provide heat to the inside of the cooking chamber 11 to allow a food material to be cooked by heat.

The heat source 40 may be provided to allow a food material to be cooked by supplying heat to the food material placed on the shelf 30. The food material may be placed on the lower surface 11*b* of the cooking chamber 11 without the shelf 30. Even in this case, the heat source 40 may provide heat to the food material placed on the lower surface 11*b*.

The heat source 40 may include a first heat source 50 arranged on the upper surface 11*a* of the cooking chamber 11, and a second heat source 60 arranged on the lower surface 11*b* of the cooking chamber 11.

The first heat source 50 may include a heater 50 configured to generate radiant heat. The heater 50 may be provided in plural. The first heat source 50 may include a plurality of heaters 51, 52, 53, and 54. The plurality of heaters 51, 52, 53, and 54 may radiate heat generated by the plurality of heaters 51, 52, 53, and 54 to directly transfer the radiant heat to the food material.

The second heat source 60 may include a magnetron 61 configured to generate a high frequency. The magnetron 61 may be provided in such a way that the high frequency generated by the magnetron 61 is irradiated to an inside of a food material to repeatedly convert a molecular arrangement of moisture contained in the food material so as to generate frictional heat between molecules, thereby cooking the inside of the food material.

The magnetron 61 may be arranged in the machine room 13. The second heat source 60 may oscillate a high frequency from the machine room 13 toward the lower surface 11*b* of the cooking chamber 11, and the high frequency may pass through the lower surface 11*b* and be irradiated to the shelf 30.

The second heat source 60 may include a stirrer 62 configured to mix the high frequency, which is oscillated from the magnetron 61, to be uniformly irradiated to the cooking chamber 11. The stirrer 62 may be provided in a circular shape having a cutout.

The stirrer 62 may be configured to radiate the high frequencies, which are directed to only one side of the cooking chamber 11, to various directions through rotation so as to allow the high frequencies to reach the entire inside of the cooking chamber 11.

The cooking apparatus 1 according to an embodiment of the disclosure may also include the first heat source 50 and the second heat source 60 to efficiently cook a food material.

The first heat source 50 may be arranged on the upper surface 11*a* of the cooking chamber 11 as described above and thus the radiant heat may be efficiently transmitted to the upper side of the food material, but it is difficult to transfer the radiant heat to the lower side of the food material.

In this case, in order to transfer additional heat to the lower side of the food material, a user stops the cooking apparatus 1 in operation to withdraw the shelf 30 from the cooking chamber 11, turns the food material over, inserts the food material back into the cooking chamber 11, and re-drives the cooking apparatus 1, which may cause the inconvenience.

To ease this difficulty, the cooking apparatus 1 according to an embodiment of the disclosure may include a heating portion 33 arranged on the shelf 30 to allow the heat to be transferred to the lower side of the food material during a cooking process.

The heating portion 33 may be arranged on an opposite side of the cooking surface 32 in the main body 31 of the shelf 30. The heating portion 33 may be provided to face the lower surface 11*b* of the cooking chamber 11 in a state in which the shelf 30 is mounted in the cooking chamber 11.

The heating portion 33 may absorb the high frequency generated by the magnetron 61 to generate heat. The high frequency radiated from the magnetron 61 facing the heating portion 33 may be absorbed by the heating portion 33, and the heating portion 33 may generate heat by the absorbed high frequency.

The heat generated by the heating portion 33 may be transferred to the cooking surface 32 through the main body 31 of the shelf 30. That is, as the heat generated by the heating portion 33 is conducted to the cooking surface 32, the heat may be supplied to the lower side of the food material positioned on the cooking surface 32.

The heating portion 33 may be formed of a ferrite material to absorb a high frequency. However, the disclosure is not limited thereto, and a material capable of generating heat by a high frequency may be mixed with ceramic and the like to form the heating portion 33.

Accordingly, even if the user does not additionally turn the food material over, heat may be supplied to the up and down direction of the food material and thus the cooking process may be performed efficiently.

The shelf 30 may be provided to partition an inner region of the cooking chamber 11.

With respect to the up and down direction, the shelf 30 may divide the inside of the cooking chamber 11 into a first cooking region 11*d* formed above the shelf 30 and a second cooking region 11*e* formed below the shelf 30.

The first cooking region 11*d* may be provided such that a food material to be cooked by the first heat source 50 and the second heat source 60 is arranged. That is, the food material arranged in the first cooking region 11*d* may be cooked by heat generated by the plurality of heaters 51, 52, 53, and 54 and the heating portion 33.

The second cooking region 11*e* may be provided such that a food material to be cooked by the second heat source 60 is arranged. That is, the food material arranged in the second cooking region 11*e* may be cooked by the high frequency generated by the second heating source 60.

The inside of the cooking chamber 11 may be partitioned by the shelf 30, and the food materials having different cooking methods may be arranged inside the cooking chamber 11 and the food materials may be simultaneously cooked in the cooking chamber 11.

That is, even when a food material to be cooked by external heat is arranged in the first cooking region 11*d* and a food material to be cooked by the high frequency is arranged in the second cooking region 11*e*, the first and second heat sources 50 and 60 may be simultaneously driven and thus the food materials may be cooked at the same time.

Accordingly, food materials, which are cooked by different cooking methods, may be cooked in the same cooking chamber 11 at once, thereby increasing user convenience.

An area of the shelf 30 in the third direction Z may be formed to correspond to an area of the cooking chamber 11 in the third direction Z. Accordingly, it is possible to partially block the transfer of heat generated by the first heat source 50 in the first cooking region 11*d* to the second cooking region 11*e*. Further, it is possible to partially block the movement of the high frequency oscillated in the second cooking region 11*e* to the first region 11*d*. Accordingly, the cooking may be performed in the first cooking region 11*d* and the second cooking region 11*e* independently of each other.

In the case of the cooking apparatus 1 including the cooking chamber 11 having a rectangular parallelepiped shape having a long side in the second direction Y as in an embodiment of the disclosure, the cooking apparatus 1 may include a plurality of heaters including a long axis extending in the long side of the cooking chamber 11.

In response to the plurality of heaters 50 being arranged on the upper surface 11*a* of the cooking chamber 11 and providing heat at different temperatures as in an embodiment of the disclosure, heat having a temperature corresponding to heat provided from each of heaters may be supplied to a position corresponding to each of heaters in the third direction Z inside the cooking chamber 11.

Particularly, on the cooking surface 32 of the shelf 30, regions, in which different temperature heat are provided, may be defined.

A plurality of regions may be formed on the cooking surface 32 at positions corresponding to the respective heaters in the third direction Z. Each region may be provided to allow different heat generated by each heater to be directly transferred thereto.

Accordingly, even when a plurality of food materials having different cooking temperatures is simultaneously put into the cooking chamber, when each of the food materials is arranged in the plurality of regions of the cooking surface 32 divided by a temperature difference, each of the food materials may be cooked according to the different cooking temperatures. That is, when each of the food materials is placed on each of different regions, the food materials may be cooked at different temperatures.

The cooking chamber 11 may be provided in a rectangular parallelepiped shape having a long side extending in the second direction Y, and the corresponding shelf 30 may include the cooking surface 32 having a rectangular shape having a long side in the second direction Y and a short side in the first direction X.

Figure 4:
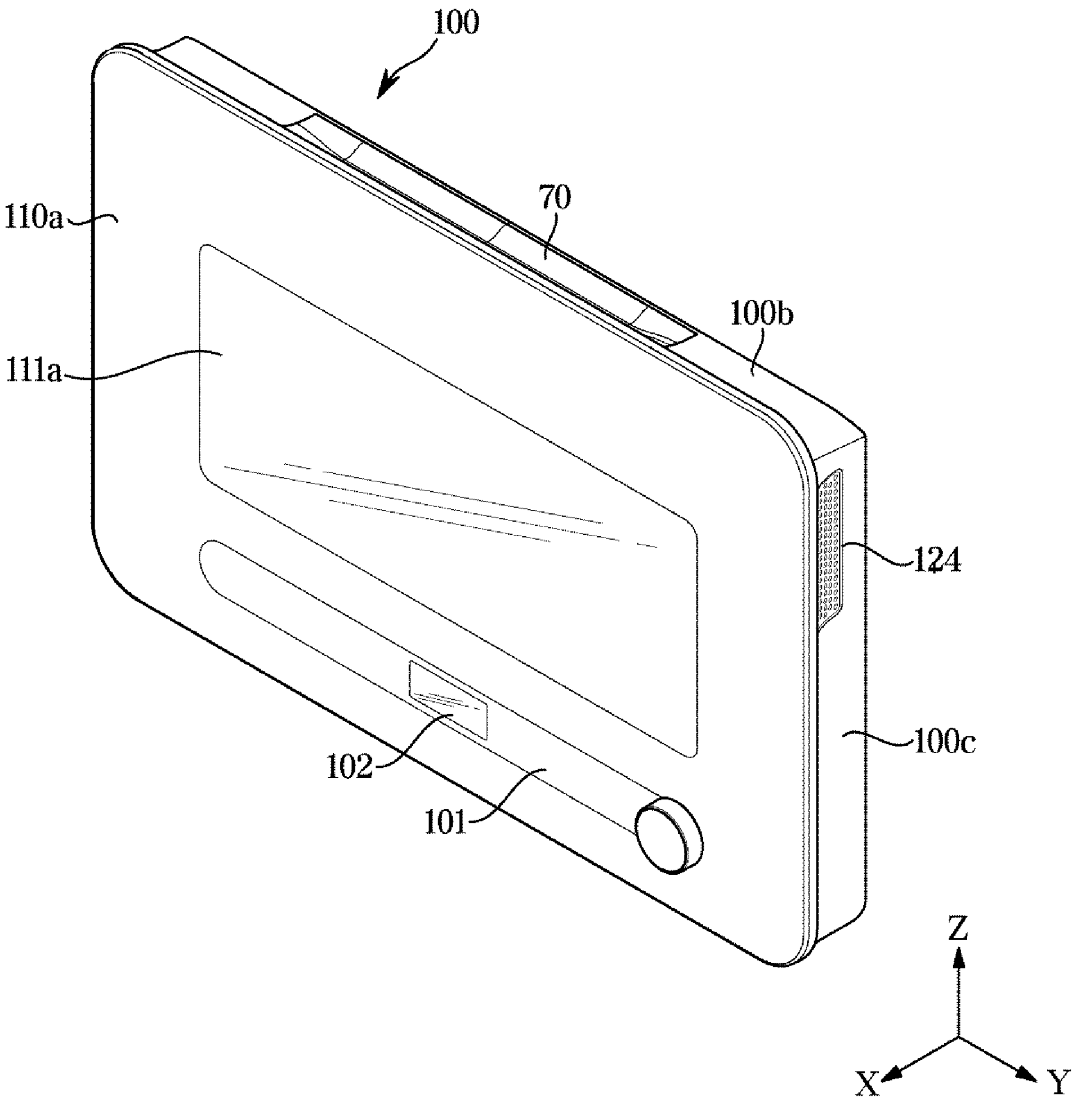
FIG. 4 is a perspective view illustrating the door of the cooking apparatus illustrated in FIG. 1.
Figure 5:
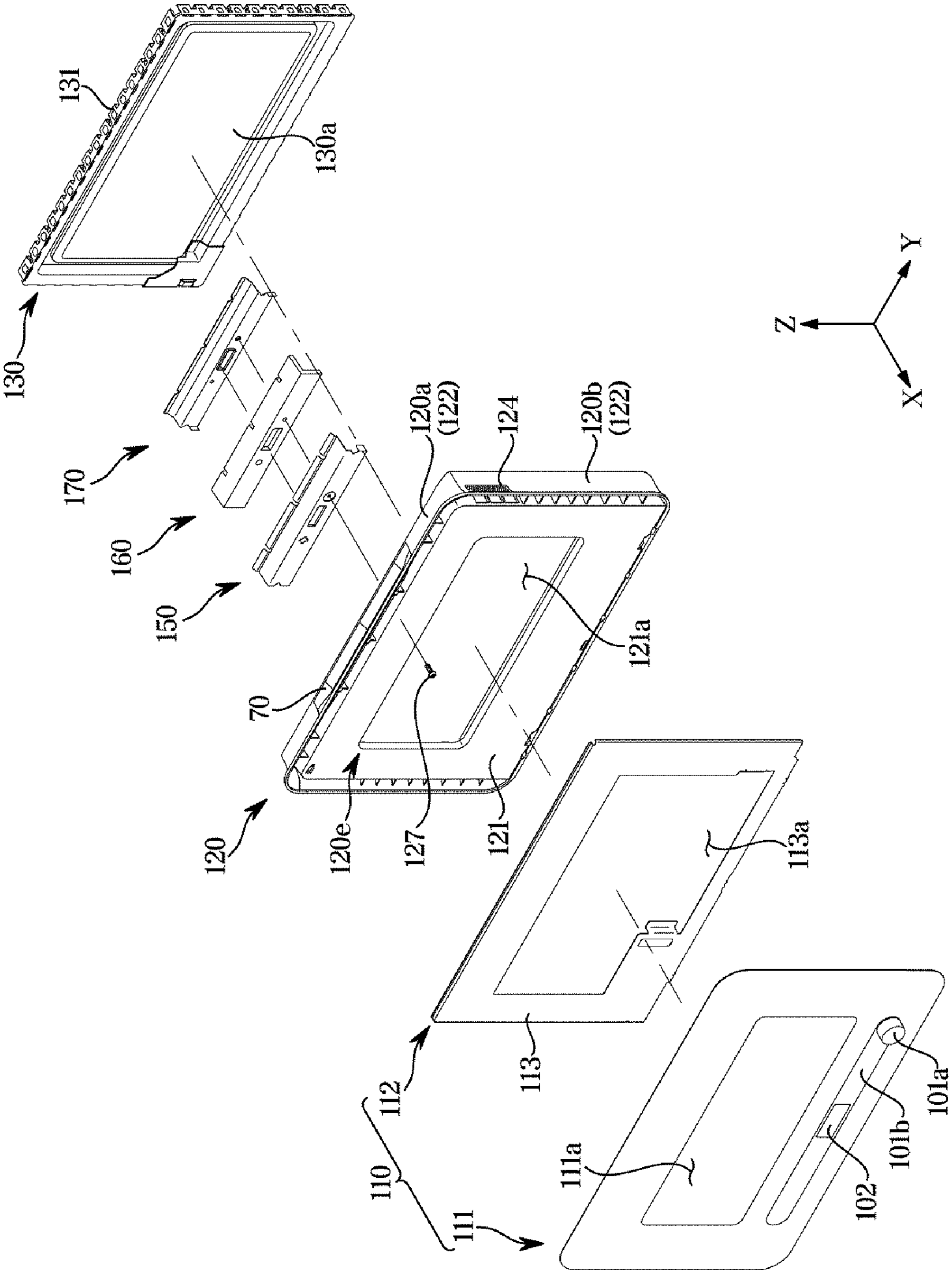
FIG. 5 is an exploded perspective view illustrating the door illustrated in FIG. 4.
Figure 6:
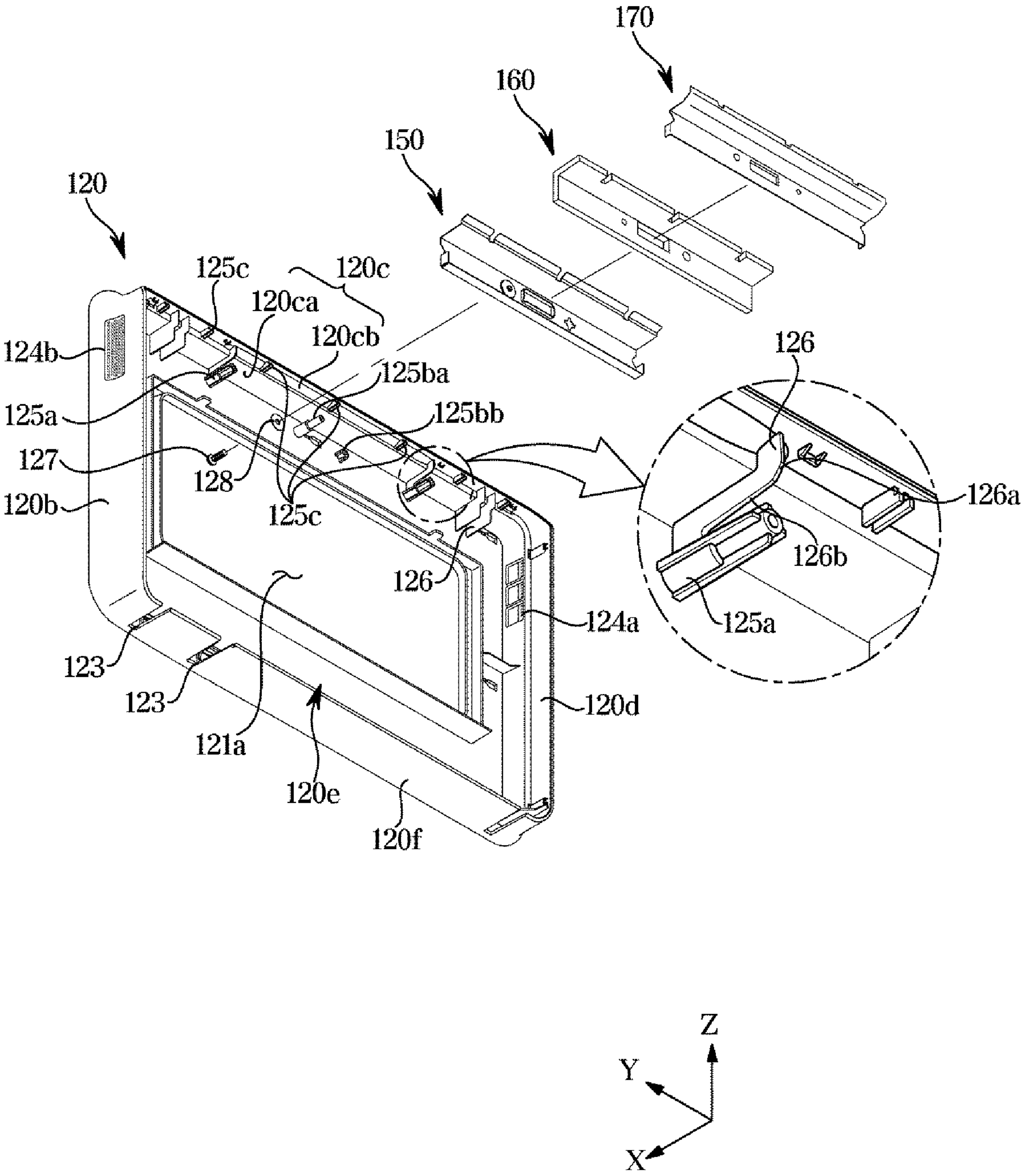
FIG. 6 is an exploded perspective view illustrating some components of the door illustrated in FIG. 5 when viewed from another angle.

FIG. 4 is a perspective view illustrating the door of the cooking apparatus illustrated in FIG. 1. FIG. 5 is an exploded perspective view illustrating the door illustrated in FIG. 4. FIG. 6 is an exploded perspective view illustrating some components of the door illustrated in FIG. 5 when viewed from another angle.

Referring to FIGS. 4 to 6, the cooking apparatus 1 according to an embodiment of the disclosure may include the door 100 configured to open and close the openings of the outer housing 10 and the inner housing 12. In other words, the door 100 may open and close the cooking chamber 11.

The door 100 may include the see-through window 111*a* to allow a user to observe the inside of the cooking chamber 11 in response to the cooking chamber 11 being closed by the door 100. The front see-through portion 111*a* may include a glass material. The see-through window 111*a* may be in contact with outside air of the cooking apparatus.

The door 100 may include the inputter 101 through which a user inputs a signal to control the cooking apparatus 1. The inputter 101 may include a dial inputter 101*a* through which a user can input a signal by rotating a dial, and a touch inputter 101*b* through which a user can touch to input a signal. The dial inputter 101*a* and the touch inputter 101*b* may use technology generally used in the industry. The inputter 101 may be provided on a door panel 110.

The door 100 may include a display 102 configured to display an image. The touch inputter 101*b* may be provided separately from the display 102. Alternatively, the touch inputter 101*b* and the display 102 may be integrally formed. In this case, the user may input a signal by touching an image displayed on the display 102.

The door 100 may include a printed circuit board (not shown) in which a plurality of electronic components is mounted, and configured to control the inputter 101 and the display 102. The printed circuit board (not shown) may partially or completely control various electronic components configured to drive the cooking apparatus 1.

The door 100 may include the door panel 110 provided to form the front surface of the door 100, a door body 120 provided to form the upper, lower, left and right surfaces of the door 100, a choke frame 130 inserted into an inside of the door body 120 from a rear side of the door body 120, and accommodated therein, and an edge frame 140 arranged in the rear side of the door body 120 to be coupled to upper, lower, left and right edges of the door body 120 so as to form a portion of the rear surface of the door 100.

The door body 120 may include a front portion 121 provided to form the front surface of the door body 120 and a flange portion 122 bent at the upper, lower, left, and right edges of the front portion 121. The flange portion 122 may form the upper surface 120*a*, the lower surface 120*f*, and the left and right surfaces 120*b* of the door 100. The handle 70 of the door 100 may be formed on the flange portion 122. The recessed portion 70 may be formed in the outer surfaces 120*a* and 120*b* of the door body.

An opening 121*a* may be formed in a center of the front portion 121. The opening 121*a* may be formed in a size and/or shape in accordance with the see-through window 111*a*. However, the disclosure is not limited thereto, and the opening 121*a* may be filled with a transparent or translucent material such as glass or plastic, and when the see-through window 111*a* is omitted, the opening 121*a* may be omitted in the front portion 121.

The door 100 may include the choke frame 130 accommodated in the door body 120 formed by being surrounded by the front portion 121 and the flange portion 122, and provided to prevent the high frequency supplied to the cooking chamber 11 from leaking to the outside.

The choke frame 130 may have a substantially rectangular shape when viewed from a front and rear direction, and a choke structure 131 provided to prevent the high frequency, which is supplied to the inner space of the cooking chamber 11, from leaking to the outdoor may be formed at upper, lower, left, and right edges of the choke frame 130.

A see-through portion 130*a* provided to form the see-through window 111*a* may be provided at approximately the center of the choke frame 130. The see-through portion 130*a* may be formed of a transparent or translucent material such as glass or plastic. In a case in which the second heat source 40 configured to generate a high frequency is omitted in the cooking apparatus 1, the choke frame 130 may be omitted.

An opening-shaped cut-out window 140*a* provided to form the see-through window 111*a* may be formed at an approximate center of the edge frame 140. However, the disclosure is not limited thereto, and the edge frame 140 may be provided in a plate shape in which the cut-out window 140*a* is omitted, and the cut-out window 140*a* may be filled by a see-through member formed of a transparent or translucent material such as glass or plastic.

The door 100 may include the door panel 110 provided to form the front surface of the door 100 and in which the inputter 101 is provided. The door panel 110 may be arranged in front of the door body 120 and may be detachably coupled to the door body 120. In response to the door panel 110 being coupled to the door body 120, the door panel 110 may be in contact with the door body 120.

The door panel 110 may include a front panel 111 provided to form a front exterior of the door 100 and a panel bracket 112 provided to detachably couple the front panel 111 to the door body 120. The front panel 111 may correspond to a front glass 111.

The front panel 111 may form the front portion of the door 100 and may have a flat plate shape. Various designs may be provided on the front surface of the front panel 111 to satisfy user needs. Further, the dial inputter 101*a* and the touch inputter 101*b* may be formed on the front surface of the front panel 111. The see-through window 111*a* formed of a transparent or translucent material may be arranged at an approximate center of the front panel 111.

The panel bracket 112 may include a bracket body 113 formed in a thin plate-shape and including an outer boundary of an approximately rectangular shape, and an opening 113*a* formed at an approximate center of the bracket body 113. The panel bracket 112 may be coupled to the door body 120.

The panel bracket 112 may be fixed to a rear surface of the front panel 111. Particularly, the bracket body 113 may be attached to the rear surface of the front panel 111 by a silicone adhesive or the like. However, the disclosure is not limited thereto, and various means such as screw fastening and welding may be used to fix the bracket body 113 to the rear surface of the front panel 111.

The door 100 may include an inlet 123 and an outlet 124. For example, the door body 120 may include an inlet 123 and an outlet 124. The inlet 123 for air may be formed at the bottom 120*f* (lower wall) of the door body 120, and the outlet 124 may be formed at the both side surface 120*b* of the door body 120. Air convected in the cooking apparatus may flow out of the cooking apparatus through the outlet 124, and the outside air may be introduced through the inlet 123. Accordingly, hot air inside the cooking apparatus may flow out, and cold air outside the cooking apparatus may be introduced into the cooking apparatus and/or an inner space 103 of the door (refer to FIGS. 10 and 11).

The outlet 124 may include a first outlet 124*a* and a second outlet 124*b*. The first outlet 124*a* may be provided inside the door body 120, and the second outlet 124*b* may be formed on an outer surface of the door body 120. Air may flow out of the cooking apparatus through the first outlet 124*a* and the second outlet 124*b*.

According to an embodiment of the disclosure, the cooking apparatus may further include a cooling plate 150, an insulating member 160, and a cover plate 170. The cooling plate 150, the insulating member 160, and the cover plate 170 may be coupled to the door body 120 by a screw 127. The cooling plate 150, the insulating member 160, and the cover plate 170 may be coupled to an upper portion of a front wall 120*e* of the door body 120 from the rear of the door body 120.

The door body 120 may further include a fixing rib 125, a connection plate 126, and a fastening hole 128.

The fixing rib 125 may fix the cooling plate 150, the insulating member 160, and the cover plate 170 to the door body 120. The fixing rib 125 may extend rearwardly from the front wall 120*e* of the door body 120. The fixing rib 125 may include a first fixing rib 125*a*, a second fixing rib 125*b*, and a third fixing rib 125*c*.

The first fixing rib 125*a* may be provided in plural. The plurality of first fixing ribs 125*a* may be spaced downward from an upper periphery of the door body 120. The plurality of first fixing ribs 125*a* may allow the cooling plate 150, the insulating member 160 and the cover plate 170 to be arranged between the plurality of first fixing ribs 125*a* in a left and right direction (refer to FIG. 9). The first fixing ribs 125*a* may allow the cooling plate 150, the insulating member 160, and the cover plate 170 to be fixed to the door body 120 without being shaken.

The second fixing rib 125*b* may pass through fixing holes 152*a*, 162*a*, and 172*a* respectively provided in the cooling plate 150, the insulating member 160, and the cover plate 170. The second fixing rib 125*b* may pass through a central portion of each of the cooling plate 150, the insulating member 160, and the cover plate 170. The second fixing rib 125*b* may be provided in plural. The plurality of second fixing ribs 125*ba* and 125*bb* may have a height different from each other.

The third fixing rib 125*c* may be formed on an upper inner surface 120*c* of the door body 120. For example, the third fixing rib 125*c* may be formed on a second upper inner surface 120*cb*. The third fixing rib 125*c* may be provided in plural. The third fixing rib 125*c* may be formed to correspond to holes 153*a*, 161*a*, and 174*a* of the cooling plate 150, the insulating member 160, and the cover plate 170, respectively.

The connection plate 126 may extend downwardly from the upper inner surface 120*c* of the door body 120. One of the connection plates 126 may be connected to the first fixing rib 125*a*. The connection plate 126 may include a depressed portion 126*b*. The depressed portion 126*b* may be depressed forwardly from a rear end 126*a* of the connection plate 126. Heat convected in the cooking apparatus may heat the first fixing rib 125*a*, and the depressed portion 126*b* may reduce an area in which the first fixing rib 125*a* and the upper inner surface 120*c* of the door body 120 are connected. Accordingly, it is possible to reduce the heat transferred from the first fixing rib 125*a* to the upper inner surface 120*c* of the door body 120. Therefore, an amount of heat transferred to the handle 70 formed on the upper outer surface of the door body 120 may be reduced.

The screw 127 may pass through the fastening hole 120 from the front to the rear of the door body 120 to allow the door body 120, the cooling plate 150, the insulating member 160 and the cover plate 170 to be coupled to each other.

Figure 7:
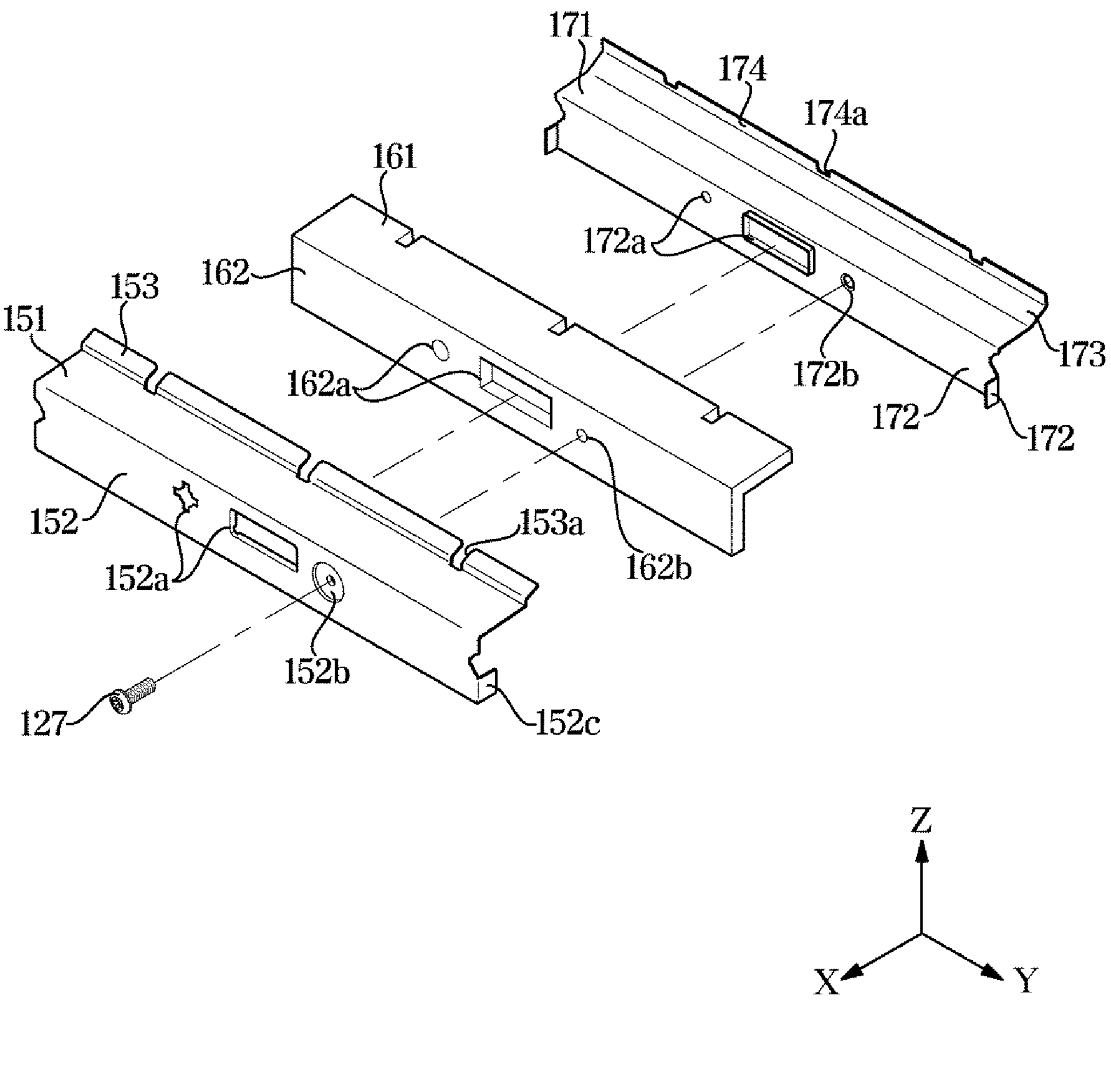
FIG. 7 is an exploded perspective view illustrating some components of the door illustrated in FIG. 5.
Figure 8:
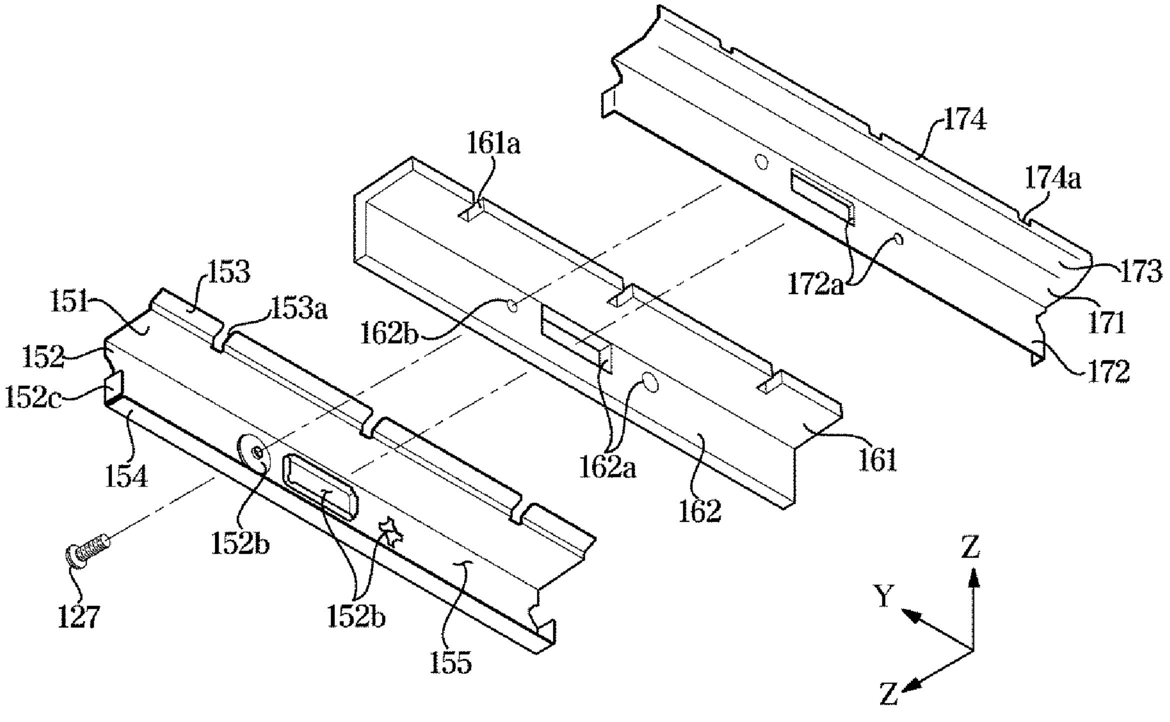
FIG. 8 is an exploded perspective view illustrating some components of the door illustrated in FIG. 7 when viewed from another angle.
Figure 9:
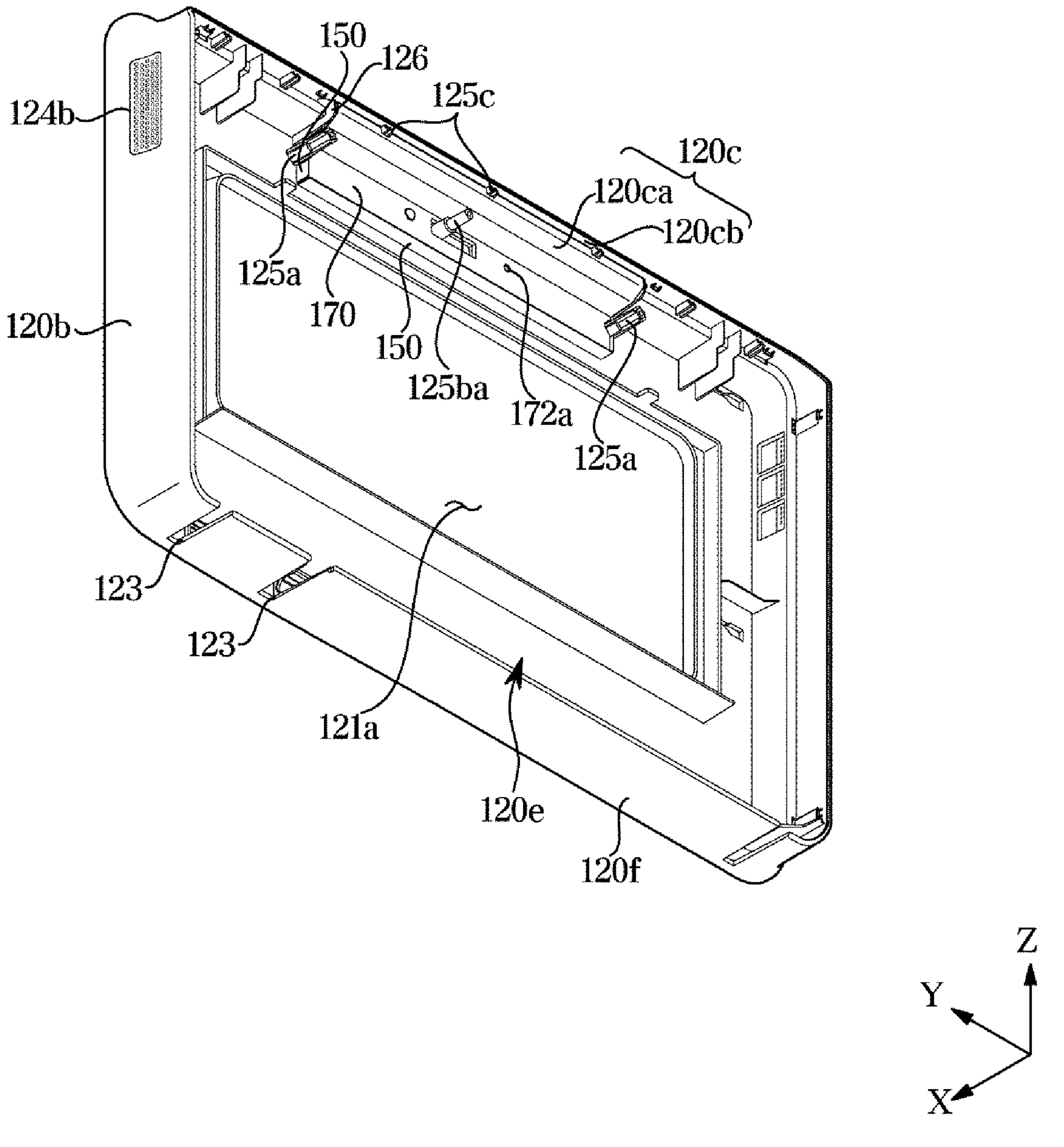
FIG. 9 is a perspective view illustrating a state in which some components of the door illustrated in FIG. 6 are coupled.

FIG. 7 is an exploded perspective view illustrating some components of the door illustrated in FIG. 5. FIG. 8 is an exploded perspective view illustrating some components of the door illustrated in FIG. 7 when viewed from another angle. FIG. 9 is a perspective view illustrating a state in which some components of the door illustrated in FIG. 6 are coupled.

Referring to FIGS. 7 to 9, according to an embodiment of the disclosure, the cooking apparatus may further include the cooling plate 150, the insulating member 160, and the cover plate 170.

The cooling plate 150 may include a first plate portion 151, a second plate portion 152, a third plate portion 153, and a fourth plate portion 154.

The first plate portion 151 may be in contact with the upper inner surface 120*c* of the door body 120. For example, the first plate portion 151 may be in contact with a first upper inner surface 120*ca* of the door body 120. The first upper inner surface 120*ca* may be a surface adjacent to the front of the upper inner surface 120*c*. The first plate portion 151 may allow the heat generated by the heater 50 to flow around the handle 70 even when the heat is transferred to the handle 70. The first plate portion 151 may be provided in a position, shape, and/or size corresponding to those of the handle 70. However, the position, shape, and/or size of the first plate portion 151 is not limited to the above example.

The second plate portion 152 may be bent downwardly from one end of the first plate portion 151. The second plate portion 152 may extend downwardly from one end of the first plate portion 151. The one end of the first plate portion 151 may be a front end (e.g., an X direction). The second plate portion 152 may be in contact with the front wall 120*e* of the door body 120. The second plate portion 152 may allow heat, which is transferred through the handle 70 and the first plate portion 151, to be transferred to the door body 120.

The third plate portion 153 may be in contact with the upper inner surface 120*c* of the door body 120. For example, the third plate portion 153 may be in contact with the second upper inner surface 120*cb* of the door body 120. The second upper inner surface 120*cb* may be a surface spaced apart from the front of the upper inner surface 120*c*. The second upper inner surface 120*cb* may be a surface far from the front of the upper inner surface 120*c*. The third plate portion 153 may allow the heat generated by the heater 50 to flow around the handle 70 even when the heat is transferred to the handle 70. The third plate portion 153 may be connected to one end of the rear side (e.g., an −X direction) of the first plate portion 151. The third plate portion 153 may be provided in a position, shape, and/or size corresponding to those of the handle 70. However, the position, shape, and/or size of the third plate portion 153 is not limited to the above example.

The fourth plate portion 154 may extend rearwardly from one end of the second plate portion 152. For example, the first plate portion 151 may extend rearwardly from an upper end of the second plate portion 152, and the fourth plate portion 154 may extend rearwardly from a lower end of the second plate portion 152. The fourth plate portion 154 may extend rearwardly to form an accommodating space 155 to accommodate the insulating member 160.

The cooling plate 150 may prevent the handle 70 from becoming excessively hot by allowing the heat transferred to the handle 70 to be transferred to other components of the cooking apparatus. For example, the cooling plate 150 may allow the heat transferred to the handle 70 to be moved toward the front panel 111 side.

Hereinafter a flow of heat will be described in detail.

When the heater 50 is operated in the cooking apparatus, the heater 50 may generate heat. Heat may be transferred to components adjacent to heater 50, and at the same time, may be transferred upward in the cooking apparatus (refer to FIGS. 10 and 11). Accordingly, the handle 70 located on the upper outer surface of the cooking apparatus may be heated. For example, because the heat generated by the heater 50 moves upward, the vicinity of the handle 70 may be heated. In this case, the first plate portion 151 and the third plate portion 153 may come into contact with the inner surface 120*c* of the door body 120, which corresponds to the outer surface 120*a* on which the handle 70 is formed, so as to transfer the heat to the second plate portion 152. The heat transferred to the second plate portion 152 may flow to the front panel 111 provided on the front side through the door body 120. Because the front panel 111 is in contact with the outside of the cooking apparatus, the front panel 111 may be a component having the lowest temperature among components of the cooking apparatus. Accordingly, because the heat transferred from the heater 50 to the handle 70 is transferred to the front panel 111 through the cooling plate 150, the temperature of the handle 70 may not become excessively high and a user may not be injured. Further, the handle 70 separated from the door 100 may be not required and thus the cost of components and processing may be saved.

The heat transfer method is not limited to conduction, and the heat may be transferred from the cooling plate 150 to the front panel 111 by various methods such as convection and radiation.

The cooling plate 150 may further include a fixing hole 152*a*, a fastening hole 152*b*, and a bending portion 152*c*.

The fixing hole 152*a* may be formed in the second plate portion 152. The fixing hole 152*a* may be formed to pass through the second plate portion 152. The second fixing rib 125*b* may pass through the second plate portion 152. The fastening hole 152*b* may allow the screw 127 to pass therethrough. The fastening hole 152*b* may be formed in the second plate portion 152 to allow the door body 120 and the cooling plate 150 to be fastened to each other. The bending portion 152*c* may extend rearwardly from opposite side ends of the second plate portion 152. The bending portion 152*c* may cover a side portion of the insulating member 160. For example, the bending portion 152*c* and the fourth plate portion 154 may cover side ends and lower ends of the insulating member 160.

A hole 153*a* provided to be coupled to the door body 120 may be formed in the third plate portion 153. The hole 153*a* may allow the third fixing rib 125*c* to pass therethrough. The hole 153*a* may be recessed forwardly from the rear of the third plate portion 153. That is, the hole 153*a* may be a groove. The hole 153*a* may be provided in plural along the left and right direction in the third plate portion 153. The number of holes 153*a* is not limited to that illustrated in the drawings.

Because the inside of the cooking apparatus is heated by the heater 50 or the like, air inside the cooking apparatus may be heated. Because the heated air rises, an airflow that rises inside the cooking apparatus may be generated. For example, rising air may be present in the inner space of the door 100. The air inlet 123 may be formed in the bottom 120*f* of the door body 120, and the outlet 124 may be formed in opposite side surfaces of the door body 120. The convected air may flow out of the cooking apparatus through the outlet 124, and the outside air may be introduced through the inlet 123. Because the outside air flows into the inner space 103 of the door, a temperature of a portion adjacent to the door 100 may be lowered. The inner space 103 of the door may be formed by the door body 120 and formed between the door panel 110 and the choke frame 130 (refer to FIGS. 10 and 11).

The insulating member 160 may block convection heat generated inside the cooking apparatus. The insulating member 160 may be accommodated in the accommodating space 155 formed by the cooling plate 150 and the cover plate 170. For example, the insulating member 160 may be arranged between the cooling plate 150 and the cover plate 170 in the front and rear direction. The insulating member 160 may be arranged under the first plate portion 151 of the cooling plate 150 to block the convection heat transferred to the handle 70. Accordingly, it is possible to prevent the handle 70 from being heated by the convection heat. The insulating member 160 may include a first insulating portion 161 and a second insulating portion 162.

The first insulating portion 161 may be covered by the first plate portion 151 of the cooling plate 150 and a first plate portion 171 of the cover plate 170. The first insulating portion 161 may be provided in a size and/or shape corresponding to those of the first plate portion 151 of the cooling plate 150 and the first plate portion 171 of the cover plate 170.

The second insulating portion 162 may be bent downwardly from one end of the first insulating portion 161 and extend. The one end of the first insulating portion 161 may be a front end (e.g., the X direction). The second insulating portion 162 may be provided in a size and/or shape corresponding to those of the second plate portion 152 of the cooling plate 150 and the second plate portion 172 of the cover plate 170.

The insulating member 160 may further include a fixing hole 162*a* and a fastening hole.

The fixing hole 162*a* may be formed in the second insulating portion 162. The fixing hole 162*a* may be formed to pass through the second insulating portion 162. The second fixing rib 125*b* may pass through the second insulating portion 162. The fastening hole 162*b* may allow the screw 127 to pass therethrough. The fastening hole 162*b* may be formed in the second insulating portion 162 to allow the insulating member 160 to be fastened to the cooling plate 150.

A hole 161*a* corresponding to the hole 153*a* of the cooling plate 150 may be formed in the first insulating portion 161. The hole 161*a* of the insulating member 160 may allow the third fixing rib 125*c* to pass therethrough. The hole 161*a* may be recessed forwardly from the rear of the first insulating portion 161. That is, the hole 161*a* may be a groove.

The cover plate 170 may be coupled to the cooling plate 150 to allow the insulating member 160 to be accommodated in the accommodating space 155. For example, the insulating member 160 may include glass fiber, and the cover plate 170 may cover the insulating member 160 to prevent debris of the glass fiber from falling into the cooking apparatus when the insulating member 160 is damaged.

The cover plate 170 may include a first plate portion 171, a second plate portion 172, a third plate portion 173, and a fourth plate portion 174.

The first plate portion 171 may be formed to correspond to the first insulating portion 161 so as to cover the first insulating portion 161 of the insulating member 160. That is, the first plate portion 171 may be positioned in an upper portion of the cover plate 170.

The second plate portion 172 may be bent downwardly from one end of the first plate portion 171. The second plate portion 172 may extend downwardly from one end of the first plate portion 171. The one end of the first plate portion 171 may be a front end (e.g., the X direction). The second plate portion 172 may cover the screw 127 passing through the fastening hole 152*b* of the cooling plate 150 and the fastening hole 162*b* of the insulating member 160.

The third plate portion 173 may be formed to correspond to the first insulating portion 161 so as to cover at least a portion of the first insulating portion 161 of the insulating member 160. The third plate portion 173 may be formed to be inclined upwardly from one end of the rear side of the first plate portion 171. For example, the third plate portion 173 may be inclined upwardly as it goes to the rear side from the rear end of the first plate portion 171.

The fourth plate portion 174 may extend upwardly from one end of the third plate portion 173. For example, the fourth plate portion 174 may extend upwardly from the rear end of the third plate portion 173.

The cover plate 170 may further include a fixing hole 172*a*, a fastening hole 172*b*, and a bending portion 172*c*.

The fixing hole 172*a* may be formed in the second plate portion 172 of the cover plate 170. The fixing hole 172*a* may be formed to pass through the second plate portion 172. The second fixing rib 125*b* may pass through the second plate portion 172. The fastening hole 172*b* may allow the screw 127 to pass therethrough. The fastening hole 172*b* may be formed in the second plate portion 172. The fastening hole 172*b* may accommodate a portion of the screw 127. The bending portion 172*c* may extend forwardly from opposite side ends of the second plate portion 172. The bending portion 172*c* may cover a side portion of the insulating member 160.

A hole 174*a* to be coupled to the door body 120 may be formed in the fourth plate portion 174. The hole 174*a* may allow the third fixing rib 125*c* to pass therethrough. The hole 174*a* may be recessed downwardly from an upper end of the fourth plate portion 174. That is, the hole 174*a* may be a groove. The hole 174*a* may be provided in plural along the left and right direction in the fourth plate portion 174. The number of holes 174*a* is not limited to that illustrated in the drawings.

Figure 10:
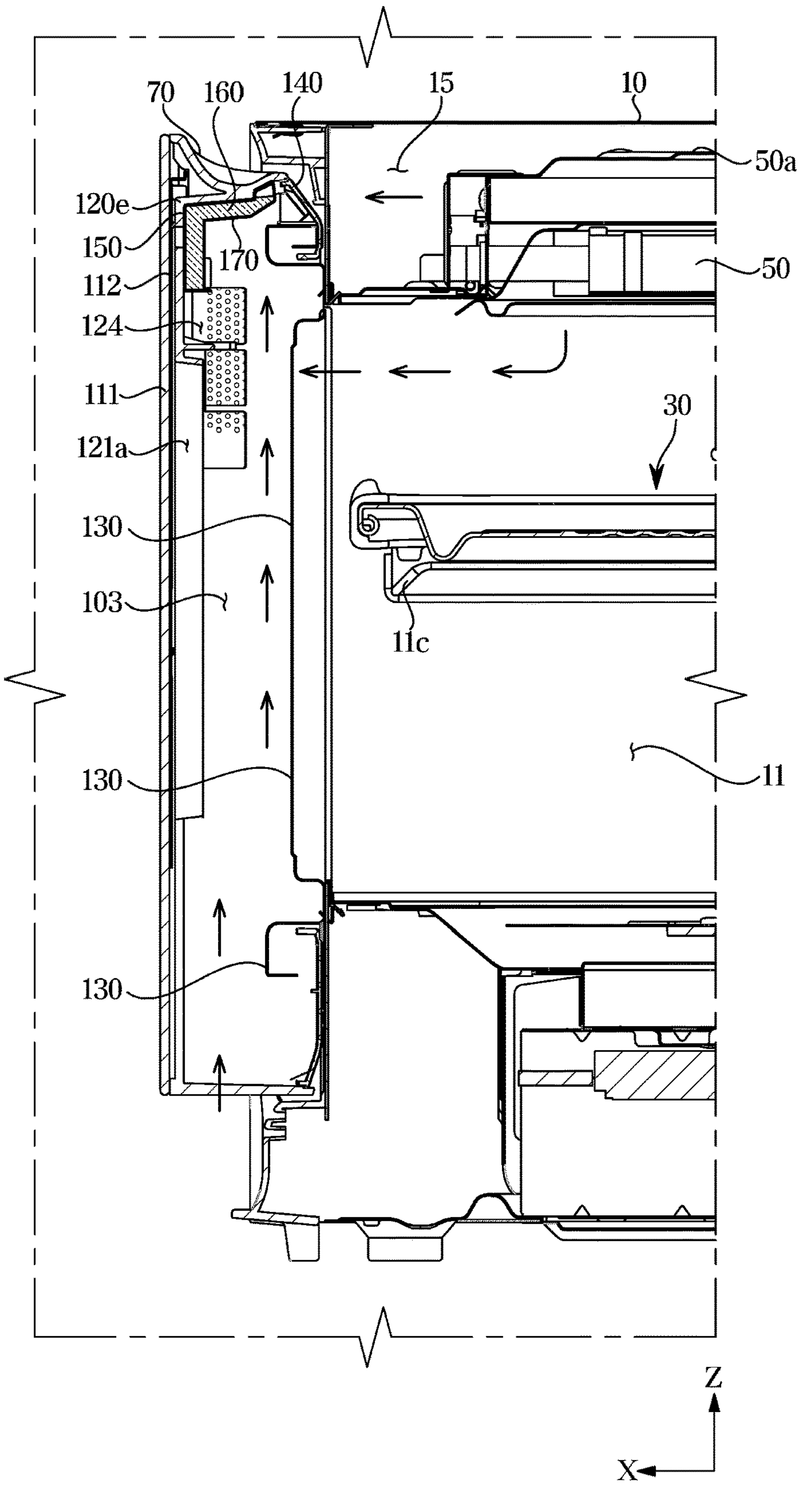
FIG. 10 is a side cross-sectional view illustrating a portion of the cooking apparatus illustrated in FIG. 1.
Figure 11:
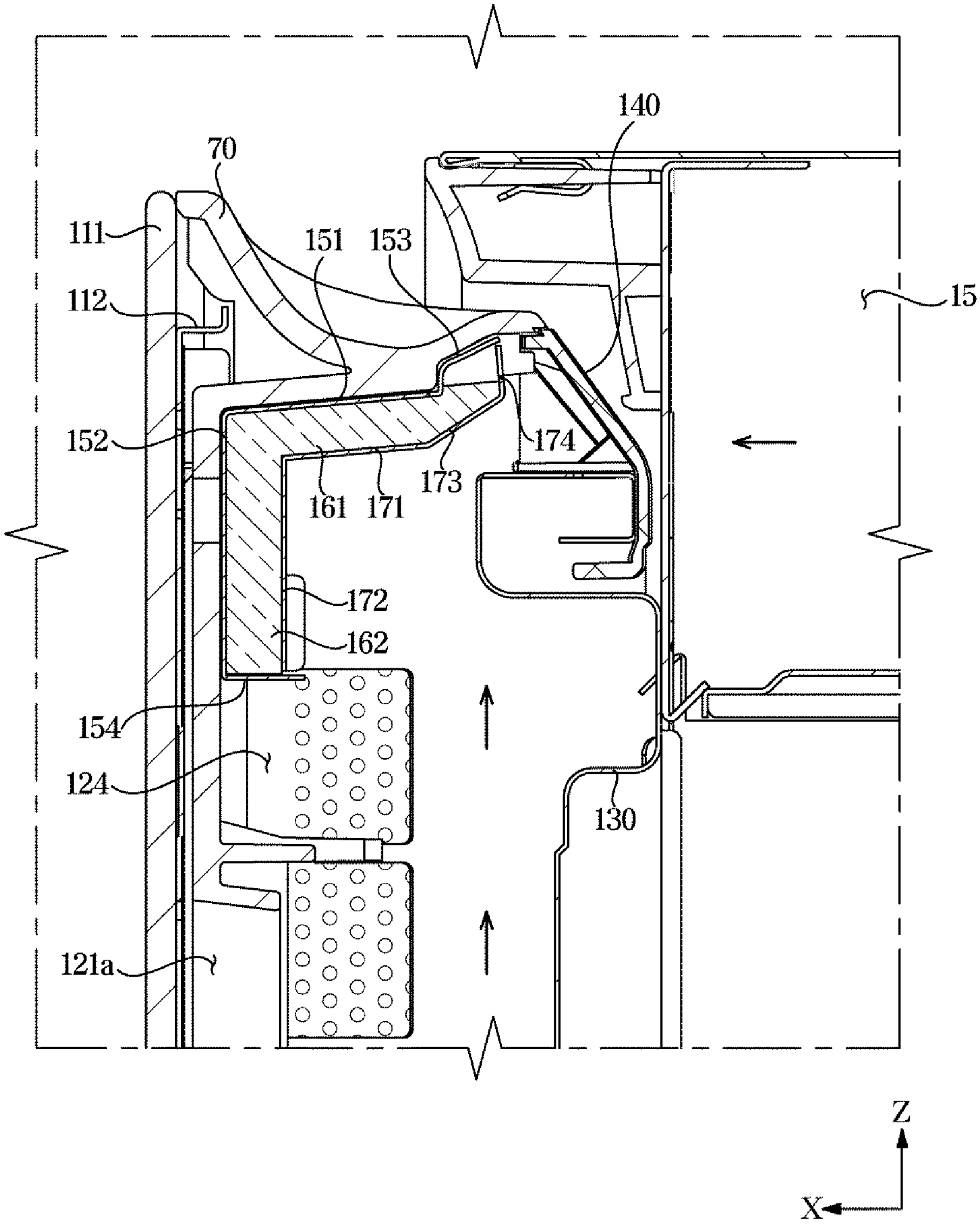
FIG. 11 is an enlarged view illustrating a portion of an upper portion of the cooking apparatus illustrated in FIG. 10.

FIG. 10 is a side cross-sectional view illustrating a portion of the cooking apparatus illustrated in FIG. 1. FIG. 11 is an enlarged view illustrating a portion of an upper portion of the cooking apparatus illustrated in FIG. 10. In FIG. 11, the fixing rib 125 is omitted for description. Arrows schematically indicate a direction of air flow and/or heat transfer.

Referring to FIGS. 10 and 11, according to an embodiment of the disclosure, heat may be generated in the heater 50. The heat generated by the heater 50 may flow around the heater 50. In addition, because the surrounding air is heated due to the heat generated by the heater 50, the air in the inner space 103 of the door and the cooking chamber 11 may rise and the convection may occur. For example, the heat generated by the heater 50 may sequentially flow through the heater case 50*a* or the inner housing 12, the edge frame 140, and the door body 120, and then flow from the inner housing 12 to the inner space 103 of the door through the choke frame 130. In other words, the heat generated by the heater 50 may be convected in the inner space 103 of the door through the above process, or may be conducted through the contact with the surrounding components of the heater 50 and then flow to the handle 70 positioned in the upper portion of the cooking apparatus. Accordingly, the heat generated by the heater 50 may be transferred to the handle 70 recessed in the upper surface of the door, and thus the handle 70 may be heated. However, the heat transfer method is not limited to the above example, and heat may be transferred to the handle by various methods such as radiation.

In this case, the cooling plate 150 may be arranged adjacent to the inner surface 120*c*, corresponding to the formation position of the handle 70, of the door. For example, the first plate portion 151 and/or the third plate portion 153 may be in contact with the upper inner surface 120*c* of the door to receive heat from the handle 70. The heat transferred to the first plate portion 151 and/or the third plate portion 153 may flow to the second plate portion 152. The heat transferred to the second plate portion 152 may flow to the front panel 111 provided on the front side through the door body 120. Because the front panel 111 is in contact with the outside of the cooking apparatus, the front panel 111 may be a component having the lowest temperature among components of the cooking apparatus. Accordingly, because the heat transferred from the heater 50 to the handle 70 is transferred to the front panel 111 through the cooling plate 150, the temperature of the handle 70 may not become excessively high and a user may not be injured. Further, the handle 70 separated from the door 100 may be not required and thus the cost of components and processing may be saved.

The heat transfer method is not limited to conduction, and the heat may be transferred from the cooling plate 150 to the front panel 111 by various methods such as convection and radiation.

Figure 12:
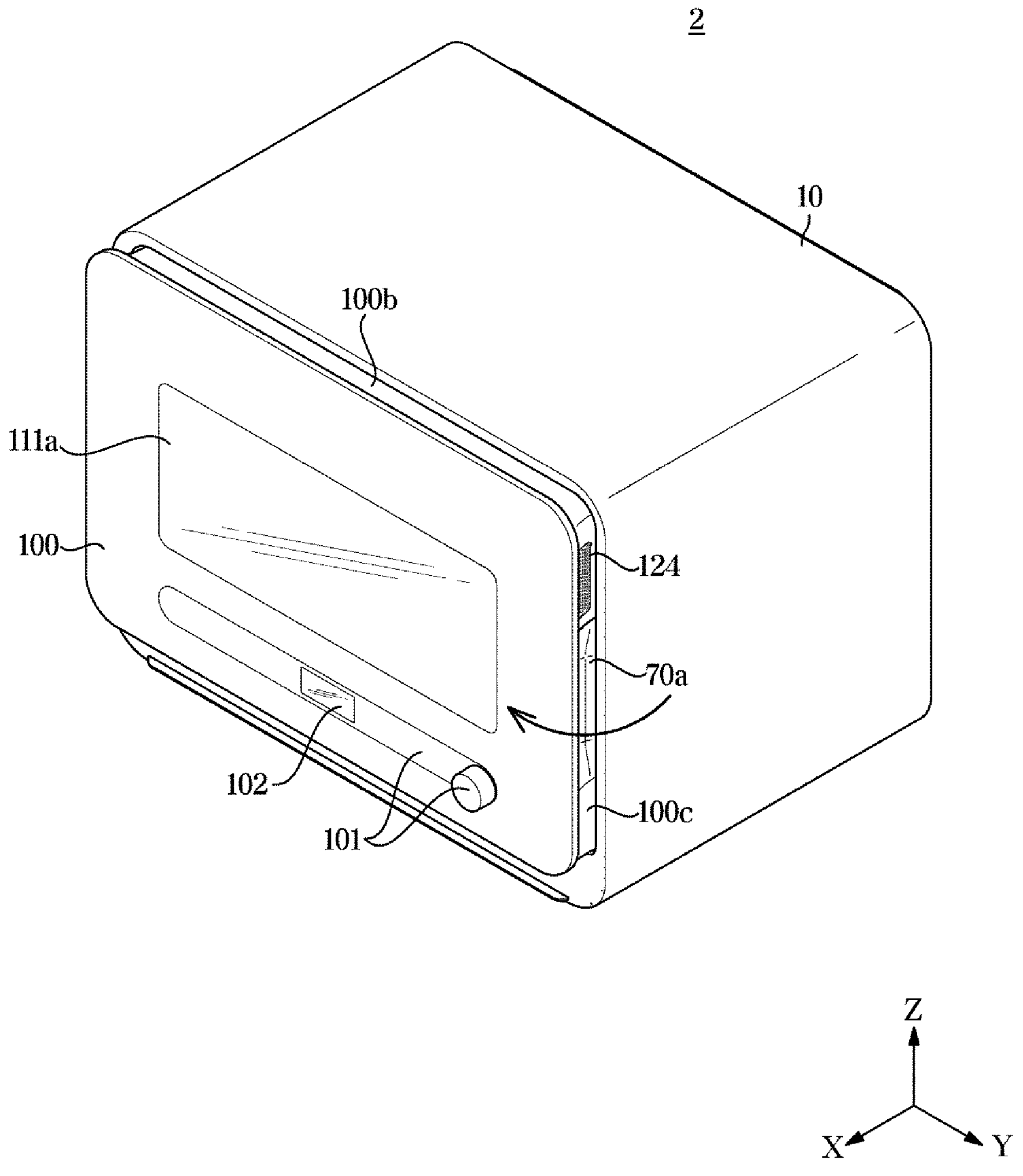
FIG. 12 is a perspective view illustrating a cooking apparatus according to another embodiment of the disclosure.
Figure 13:
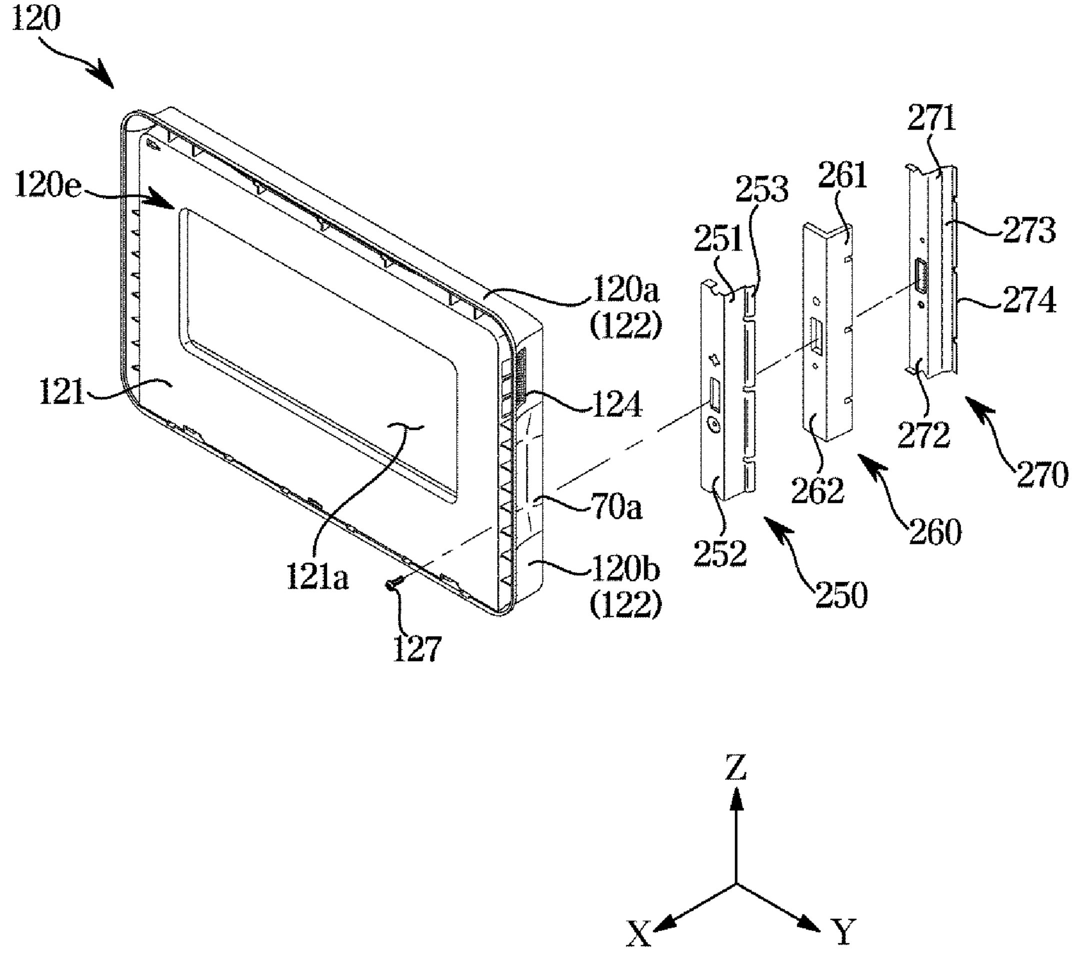
FIG. 13 is an exploded perspective view illustrating a door of the cooking apparatus illustrated in FIG. 12.
Figure 14:
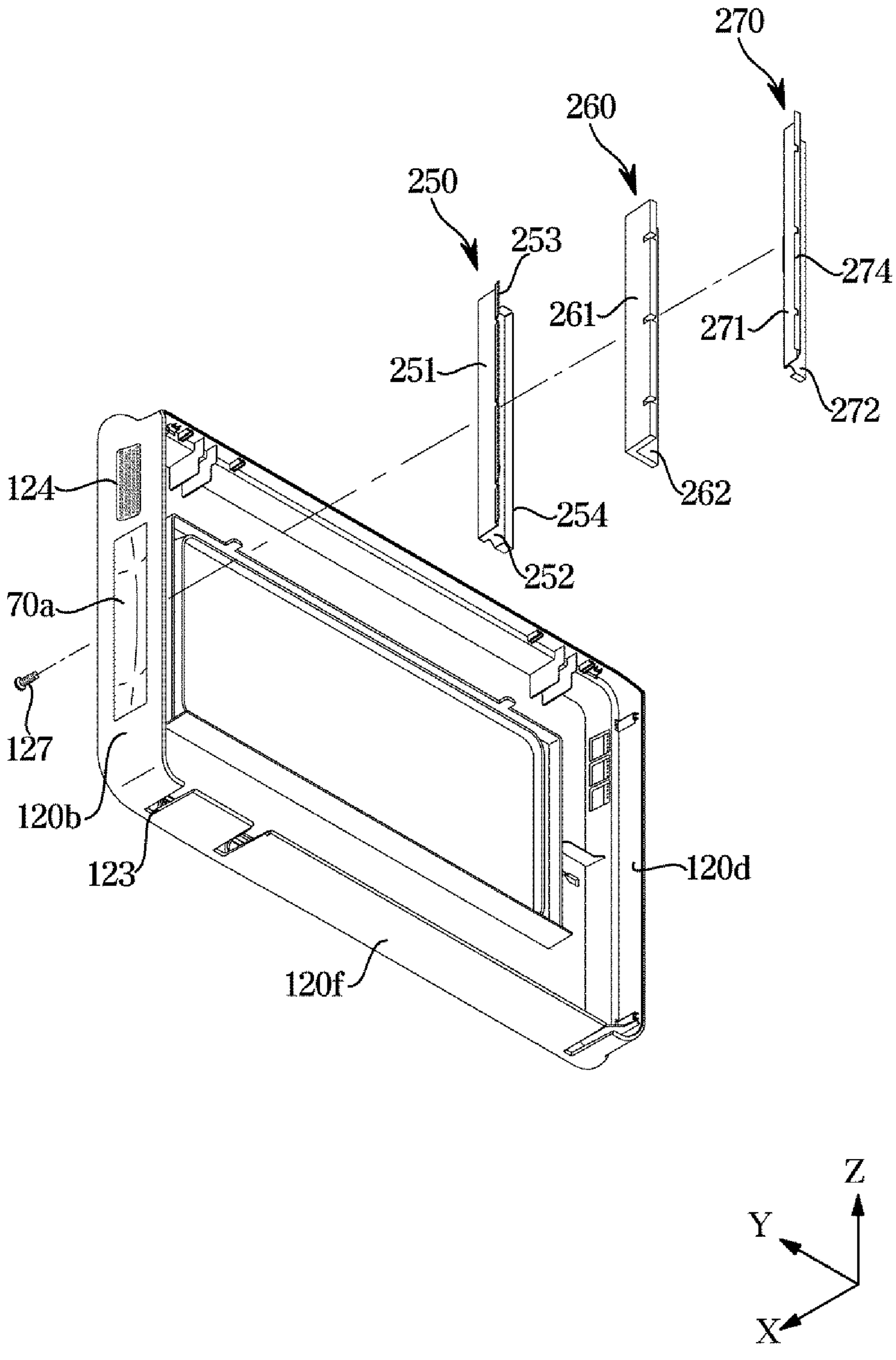
FIG. 14 is an exploded perspective view illustrating some components of the door illustrated in FIG. 13 when viewed from another angle.

FIG. 12 is a perspective view illustrating a cooking apparatus according to another embodiment of the disclosure. FIG. 13 is an exploded perspective view illustrating a door of the cooking apparatus illustrated in FIG. 12. FIG. 14 is an exploded perspective view illustrating some components of the door illustrated in FIG. 13 when viewed from another angle.

The same reference numerals may be assigned to the same components as in the above-described embodiment, and detailed descriptions thereof will be omitted.

Referring to FIGS. 12 to 14, according to another embodiment of the disclosure, a cooking apparatus 2 may include a handle 70*a*, a cooling plate 250, an insulating member 260, and a cover plate 270.

The handle 70*a* may be recessed from the side surface 120*b* of the door body 120. In this case, the door 100 may be rotatable using the left and/or right front end of the outer housing 10 as a rotation axis. In response to the door 100 being opened and closed, the front side of the door 100 may face left or right. The handle 70*a* may be formed in a central portion of the side surface with respect to the up and down direction.

The cooling plate 250, the insulating member 260, and the cover plate 270 may have sizes and shapes corresponding to those of the handle 70*a*.

The cooling plate 250 may include a first plate portion 251, a second plate portion 252, a third plate portion 253, and a fourth plate portion 254.

The first plate portion 251 may be in contact with an inner lateral surface 120*d* of the door body 120. The first plate portion 251 may allow heat generated by the heater to flow around the handle 70*a* even though the heat is transferred to the handle 70*a*. The first plate portion 251 may be provided in a position, shape, and/or size corresponding to those of the handle 70*a*.

The second plate portion 252 may be bent from one end of the first plate portion 251 and extend in a right direction (e.g., a −Y direction). The one end of the first plate portion 251 may be a front end (e.g., the X direction).

The third plate portion 253 may be in contact with the inner lateral surface 120*d* of the door body 120. The third plate portion 253 may be connected to one end of the rear side (e.g., the −X direction) of the first plate portion 251. The third plate portion 253 may be provided in a position, shape, and/or size corresponding to those of the handle 70*a*.

The fourth plate portion 254 may extend rearwardly from one end of the second plate portion 252. For example, the first plate portion 251 may extend rearwardly from a left end of the second plate portion 252, and the fourth plate portion 254 may extend rearwardly from a right end of the second plate portion 252.

The insulating member 260 may include a first insulating portion 261 and a second insulating portion 262. The first insulating portion 261 may be covered by the first plate portion 251 of the cooling plate 250 and a first plate portion 271 of the cover plate 270. The second insulating portion 262 may be bent rightward from one end of the first heat insulating portion 261 and extend. The one end of the first insulating portion 261 may be a front end (e.g., the X direction).

The insulating member 260 may block convection heat generated inside the cooking apparatus. The insulating member 260 may be arranged on a lateral side of the first plate portion 251 of the cooling plate 250 to block the convection heat transferred to the handle 70*a*. Accordingly, it is possible to prevent the handle 70 from being heated by the convection heat.

The cover plate 270 may include the first plate portion 271, a second plate portion 272, a third plate portion 273, and a fourth plate portion 274.

The first plate portion 271 may be formed to correspond to the first insulating portion 261 so as to cover the first insulating portion 261 of the insulating member 260. That is, the first plate portion 271 may be located on the left side of the cover plate 270. The second plate portion 272 may be bent rightward from one end of the first plate portion 271 and extend. The one end of the first plate portion 271 may be a front end (e.g., the X direction). The third plate portion 273 may be inclined from one end of the rear side of the first plate portion 271. The fourth plate portion 274 may extend leftward from one end of the third plate portion 273. For example, the fourth plate portion 274 may extend leftward from the rear end of the third plate portion 273.

During the heater 50 is in operation, the inside of the cooking apparatus becomes hot, and thus the vicinity of the handle 70*a* may be heated. In this case, the first plate portion 251 and the third plate portion 253 of the cooling plate 250 may be in contact with the inner lateral surface 120*d* of the door body 120 corresponding to the outer surface 120*b*, on which the handle 70*a* is formed, to transfer the heat to the second plate portion 252. The heat transferred to the second plate portion 252 may flow to the front panel 111 provided on the front side through the door body 120. Because the front panel 111 is in contact with the outside of the cooking apparatus, the front panel 111 may be a component having the lowest temperature among components of the cooking apparatus. Accordingly, because the heat transferred from the heater 50 to the handle 70*a* is transferred to the front panel 111 through the cooling plate 150, the temperature of the handle 70*a* may not become excessively high and a user may not be injured. Further, the handle 70*a* separated from the door 100 may be not required and thus the cost of components and processing may be saved.

In the above embodiment, the handle 70*a* has been described as being formed on the left side 120*b* of the door body 120, but the same may be applied to the handle 70*a* formed on the right side of the door body 120.

As is apparent from the above description, a cooking apparatus may include a heat dissipation structure configured to dissipate heat transferred to a door.

A user can safely use a cooking apparatus because a temperature of a handle does not rise to a high temperature.

Although a few embodiments of the disclosure have been shown and described, it would be appreciated by those skilled in the art that changes may be made in these embodiments without departing from the principles and spirit of the disclosure, the scope of which is defined in the claims and their equivalents.

What is claimed is:

1. A cooking apparatus comprising:

a cooking chamber;

a heater in an upper side of the cooking chamber to heat an inside of the cooking chamber;

a door to open and close the cooking chamber, the door including:

a door body having a portion that has an outer surface forming an upper outer surface of the door body, and an inner surface opposite the outer surface that is an upper inner surface of the door body, wherein the upper inner surface has a first upper inner surface at a front side of the upper inner surface and a second upper inner surface that is to a rear of the first upper inner surface and that is higher than the first upper inner surface, and the portion is recessed inward from the outer surface to form a handle, and a front panel coupled to a front of the door body and allowing the inside of the cooking chamber to be seen from an outside of the cooking apparatus; and a cooling plate to a rear of the handle and including:

a first plate portion in contact with the first upper inner surface to allow heat generated by the heater to flow around the handle to the first upper inner surface, a second plate portion bent downwardly from an end of the first plate portion and in contact with a front wall of the door body to allow heat which is generated by the heater and transferred through the handle and the first plate portion, to be transferred to the door body, and a third plate portion extending upward from the first plate portion and in contact with the second upper inner surface to allow heat generated by the heater to flow around the handle to the second upper inner surface, wherein the front panel, the door body, and the cooling plate are sequentially in contact with each other to transfer heat from the cooling plate toward the front panel.

2. The cooking apparatus of claim 1, further comprising:

an insulating member disposed under the first plate portion to block transfer of convection heat to the handle.

3. The cooking apparatus of claim 2, further comprising:

a cover plate coupled to the cooling plate from a rear of the cooling plate so that the insulating member is accommodated between the cover plate and the cooling plate.

4. The cooking apparatus of claim 3, wherein the cover plate and the insulating member are formed in a size in accordance with the cooling plate.

5. The cooking apparatus of claim 1, wherein the handle is in a central portion of an upper end of the door body, the door body includes a plurality of fixing ribs protruding rearwardly from the front wall and fixing the cooling plate, and the cooling plate is between the plurality of fixing ribs in a left and right direction.

6. The cooking apparatus of claim 5, wherein the plurality of fixing ribs is spaced downward from an upper periphery of the door body, the door body further includes a plurality of connection plates extending downwardly from the upper periphery of the door body toward each of the plurality of fixing ribs and connecting each of the plurality of fixing ribs to the upper periphery of the door body, and each of the plurality of connection plates includes a depressed portion depressed toward the front of the door body to reduce heat transferred from the plurality of fixing ribs to the handle.

7. The cooking apparatus of claim 5, wherein the cooling plate is screw-fastened to the front wall of the door body.

8. The cooking apparatus of claim 1, wherein the door body further includes:

an inlet formed at a bottom of the door body to allow outside air to be introduced, and an outlet formed in a side wall of the door body to allow air, which is introduced through the inlet, to be discharged.

9. The cooking apparatus of claim 1, wherein the outer surface of the portion of the door body is an outer lateral surface of the door body, and the inner surface of the portion of the door body is an inner lateral surface of the door body.

10. The cooking apparatus of claim 1, further comprising:

a cover plate behind the cooling plate; and an insulating member between the cooling plate and the cover plate.

* * * * *